United States Patent [19]

Morrison et al.

[11] 4,140,906

[45] Feb. 20, 1979

[54] DENSITY METER

[75] Inventors: Lowell D. Morrison; Gale Puerner, both of Fort Atkinson, Wis.

[73] Assignee: Seaman Nuclear Corporation, Milwaukee, Wis.

[21] Appl. No.: 813,938

[22] Filed: Jul. 8, 1977

[51] Int. Cl.[2] ............................................ G01M 23/00

[52] U.S. Cl. .................................... 250/308; 250/272; 250/306; 250/358 R

[58] Field of Search ............... 250/308, 306, 307, 358, 250/272

[56] References Cited

U.S. PATENT DOCUMENTS

| | | | |
|---|---|---|---|
| 3,143,886 | 8/1964 | Lippke | 250/358 R |
| 3,499,152 | 3/1970 | Hetenhouser | 250/308 |
| 3,505,520 | 4/1970 | Stewart et al. | 250/272 |

*Primary Examiner*—Harold A. Dixon

[57] ABSTRACT

A device for taking air gap backscatter radiation measurements at a pair of predetermined distances from the surface of a material is disclosed. The ratio of the first and second measurements are a function of the density of the material when one of the distances is sufficiently large that the measurement is dependent on the chemical content of the material but is independent of surface irregularities and density and when the second distance is greater than the average surface irregularity but sufficiently proximate to the material so that the measurement is independent of surface irregularities but is dependent on the density and the chemical content of the material. The device includes a housing slidably supported between a pair of end plates, a carrying handle for the device and a source within the housing. When the handle is in a first position, the source is disposed in a storage or "safe" position. Rotation of the handle to a second position moves the source to a first "use" position, and rotation of the handle to a third predetermined position also places the source in the use position and raises the housing with respect to the end plates. Differential backscatter radiation measurements are taken while the device is in its two use positions.

22 Claims, 11 Drawing Figures

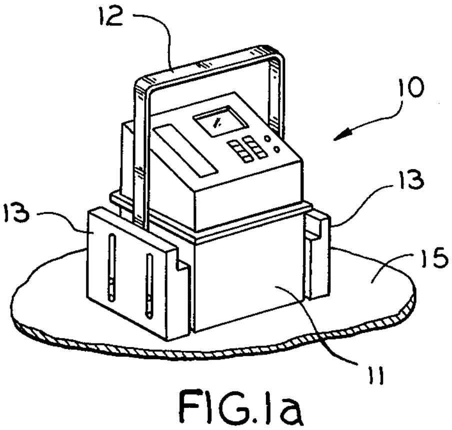
FIG.1a
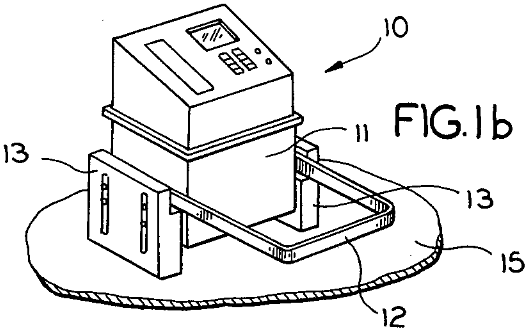
FIG.1b
FIG.1c
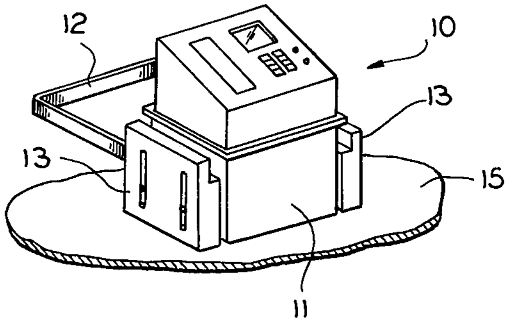
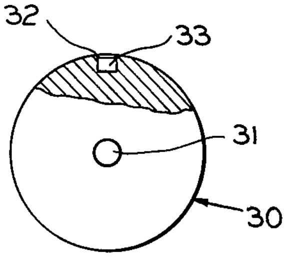
FIG.3
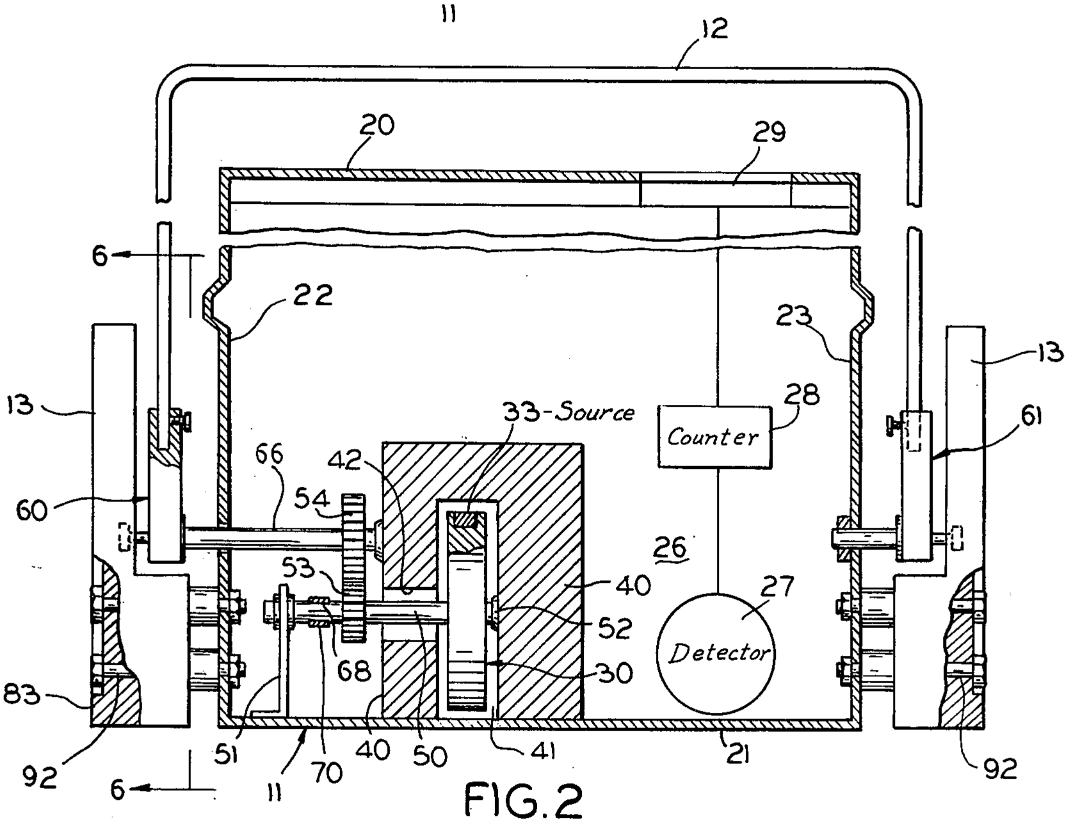
FIG.2

DENSITY METER

FIELD OF THE INVENTION

This invention relates generally to the art of density meters and more specifically to density meters designed for taking air gap radiation backscatter measurements at a pair of predetermined distances from the surface of a material.

BACKGROUND OF THE INVENTION

The backscatter method of determining the density or moisture content of a material comprises exposing the surface of a material to direct radiation from radioactive source and measuring the backscatter radiation with a detector at an external position which is shielded from direct radiation. The source typically comprises a radioisotope, such as Radium, which emits gamma photons and the detector is selected to be responsive to photons and is coupled to a counter for totaling the photons impinging on the detector during a predetermined time period. The gamma rays entering the material are scattered by the electrons of the material and the number of photons which are directed toward the detector provide an indication of the density of the material when compared to a calibration curve for the particular instrument. A direct relationship exists between a material's density and the amount of radiation it will absorb and scatter.

In one prior art method of determining density by backscatter measurement, the instrument is placed in direct contact with the material. This method is not entirely satisfactory because the density measurement is subject to two variables: surface irregularities and chemical composition. Surface irregularity represents a serious obstacle to accurate measurement when density readings are taken of materials such as concrete, asphalt, soil, aggregetes and the like. Surface preparation is required to smooth out the irregularities as much as possible, and the surface preparation is time consuming and requires static readings at the prepared surface. The chemical composition of the material affects the respective amounts of radiation that will be absorbed and scattered. For example, high silicon content materials and high iron content materials may have approximately the same density but will provide different meter readings with the contact method. This prior art method included the use of a calibration curve for each type of material. However, the chemical composition of a material may not always be known.

To eliminate chemical variation errors inherent in the contact process, an air gap ratio method was developed. This method includes the taking of a first reading with the meter in direct contact with the material and a second reading with an air gap between the meter and the material. When the contact reading is made, the number of photons counted by the detector is a function of the chemical composition, density and surface irregularity of the material. When the air gap reading is taken, however, the number of photons counted by the detector is functionally related more closely to the composition of the material. As a result, the density of the material can be determined irrespective of chemical composition by comparing the ratio of the air gap reading to the contact reading. The chemical factor is eliminated so that the ratio can be compared to a calibration curve for the instrument to provide a density reading. The air gap-contact process however, is still sensitive to surface irregularities, so that accurate measurement still required time consuming surface preparation.

A further advance in this art was made when it was discovered that, if both backscatter measurements are taken at preselected distances from the surface of the material, the surface irregularity variable could also be eliminated to provide more accurate final readings. Instead of the contact measurement just described a measurement is taken at a location just above the surface. A ratio is then established and compared to a calibration curve to provide a final density reading.

While the latter method has overcome some of the initial problems in the development of this art, the equipment used for taking the measurements has not developed at the same rate. Because radioactive materials are employed in the measuring process, great care must be taken to properly shield the source material not only from the detector but from the operator of the instrument. In addition, if the air gap method is to be employed, the instrument must be precisely located at the predetermined distances from the surface of the material. The instrument should also indicate at all times whether the source is in a use or a "safe" position and the source should automatically be returned to the safe or storage position when the instrument is being moved, shipped or stored. An instrument which satisfies these criteria would be a significant advance in this technology.

OBJECTS OF THE INVENTION

It is a primary object of the present invention to provide an instrument for taking backscatter radiation measurements which satisfies the aforementioned operating and design criteria.

It is another object of the present invention to provide a moisture or density testing instrument which is capable of accurately locating a radioactive source in one of two positions and which clearly indicates that the source is in use with reference to a storage position.

Yet another object of the present invention is to provide a testing instrument which automatically insures that the source is in a shielded storage position when the instrument is being carried, stored or shipped.

A further object of the present invention is to provide a testing instrument of the class described in which the instrument's carrying handle provides a visual indication of source position.

How these and other objects of the invention are accomplished will be described in the following specification taken in conjunction with the FIGURES. Generally however, the objects are accomplished by providing a housing containing a rotatable radioactive source means, a detector and a counter. The source can be rotated from a storage position into a use position and is properly shielded from the operator and detector in each of these positions. End plates are provided for the housing, and the housing is slidably mounted with respect thereto. Finally a carrying handle is operatively connected to the end plates, housing and the rotatable source. When the handle is placed in a first position, the source is located in the storage or safe position. When the handle is placed in a second position, the source is rotated to a use position for taking a first backscatter radiation measurement. When the handle is moved to a third position, the source is also located in its use position but the housing is raised with respect to the end plates so that the source is moved away from the surface of the material being tested.

DESCRIPTION OF THE DRAWINGS

FIG. 1(*a*) is a perspective view of a testing instrument according to a preferred form of the present invention, the handle being in the vertical or carrying position;

FIG. 1(*b*) is a perspective view of the testing instrument according to FIG. 1(*a*) showing the handle rotated forward 90°, the instrument being in one use position showing the upward displacement of the housing with respect to the instrument's end plates;

FIG. 1(*c*) is a perspective view of the testing instrument of FIG. 1(*a*) showing the handle rotated rearwardly 90°, the instrument being in a second use position;

FIG. 2 is a side cross section of one preferred form of testing instrument according to the present invention;

FIG. 3 is a side view, with parts broken away, of the source means the present invention.

DESCRIPTION OF THE PREFERRED EMBODIMENT

Figure 4:
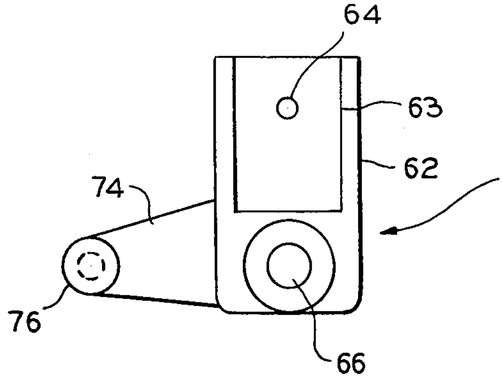
FIG. 4 is a side view of a handle mounting arm of the preferred embodiment.

FIGS. 1(*a*)–1(*c*) show one preferred form of testing instrument 10 according to the present invention to generally include a housing 11, a carrying handle 12 and a pair of end plates 13. Housing 11 includes on its top a display screen 14 and various controls for adjusting and monitoring the detector and counter. The controls will not be described in detail because in and of themselves they form no part of the present invention. FIGS. 1(*a*-)–1(*c*) also show the operating positions of instrument 10 and it can be seen that handle 12 provides a visual indication of the three positions. In FIGS. 1(*a*) and 1(*c*) the end plates 13 and housing 11 are in the same relative positions, while in FIG. 1(*b*) the housing 11 is displaced upwardly with respect to end plates 13 so that the base of housing 11 is elevated away from the surface 15 which supports the instrument. A more detailed description of the operation of instrument 10 will be provided in a later section of this specification.

FIG. 2 shows in cross-section the major internal components of the preferred embodiment of the present invention. Housing 11 is generally rectangular in cross-section and includes a top 20 and bottom 21 and end walls 22 and 23. The housing is preferably constructed from aluminum, plastic or other suitable materials which give the desired structural strength and freely pass the photons employed for the density measurements. Within the right hand side of housing 11, adjacent end wall 23, a radiation detection system 26 is shown in schematic form. The system includes a geiger tube 27 which is sensitive to photons, a counter 28 for collecting and totaling the photon sensed by tube 27 and a display 29 for providing a visual readout to the machine operator. These components of instrument 10 have been shown in schematic form and have been described in only general terms because systems for detecting, counting and displaying photon measurements are generally known to the art. Any number of these known systems could be used in the present invention. Not shown in FIG. 2 is a power supply for radiation detection system 26.

FIG. 2 also shows a source wheel 30 mounted in housing 11. The source wheel 30 is shown in enlarged form in FIG. 3. Source wheel 30 is a generally circular plate having a central bore 31. In a preferred form the plate is approximately 0.75" in thickness while the bore 31 also has a diameter of approximately 0.75". At the periphery of source 30 a cylindrical hole 32 is provided for a radiation emitting material 33. Again in the preferred form the receptacle may be 0.4–0.5" in width and depth. In FIG. 2 the radioactive material 33 is disposed toward the top 20 of housing 11 and the axis of wheel 30 is perpendicular with respect to the end walls 22 and 23 of housing 11.

The radioactive material 33 is shielded from detector tube 27 by the wheel 30 and a barrier 40 both of which are constructed of lead, or other suitable material, to prevent tube 27 from being directly exposed to radiation. Barrier 40 in effect separates housing 11 into source and detector portions and additionally serves to protect the machine operator for exposure to potentially harmful radiation. Barrier 40 satisfies these objectives and defines a hollow cavity 41 which surrounds source wheel 30. A circular opening 42 is provided in the wall of barrier 40 nearest end wall 22 for admitting shaft 50, soon to be described. The opening is generally adjacent bore 31 of source wheel 30 and has a diameter slightly larger than shaft 50.

If source wheel 30 is rotated 180° from the position shown in FIG. 2 the radioactive material 33 will be directed toward bottom 21 of housing 11 which, as has been mentioned, is selected of a material which allows penetration of the photons emitted from material 33. However, in all other positions the source is directed toward the radiation absorbing material barrier 40 and both the operator and tube 27 are shielded therefrom.

A cylindrical shaft 50 is mounted between barrier 40 and an internal support 51. A socket 52 is secured within barrier 40 to receive a first end of shaft 50 and a gear 53 is disposed on shaft 50 between the Internal support 51 and the barrier 40. Source 30 is fixedly secured to shaft 50 within cavity 41. The gear 53 will be more fully explained below.

Figure 5:
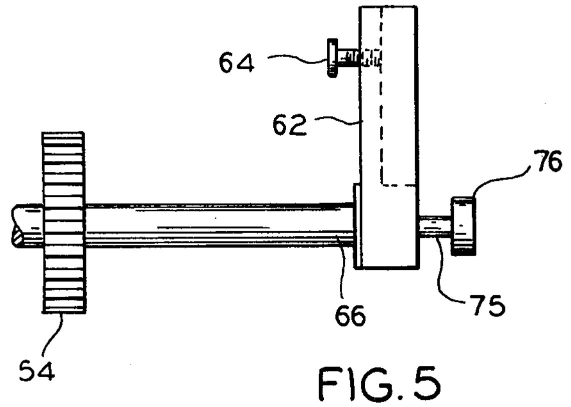
FIG. 5 is an end view of the mounting arm illustrated in FIG. 4.

FIGS. 4 and 5 show in side and end views respectively a handle mounting arm 60, which, as is shown in FIG. 2, is disposed exteriorly of end wall 22 of housing 11. A similar arm 61 is located exteriorly of end wall 23 at the opposite side of housing 11.

Arm 60 includes a first plate member 62 having a handle receiving opening 63 at its upper end. A set screw 64 is provided for locking the handle within opening 63. Disposed at the lower end of plate 62 is a first stub shaft 66 secured perpendicularly to the face of plate 62.

In its operating position, the face plate 62 is parallel to end wall 22 and shaft 66 passes through end wall 22 and is rotably secured to barrier 40 so that it is arranged parallel to shaft 50. Shaft 66 includes a gear 54 mounted thereon and the gears 53 and 54 are selected and oriented so that rotation of shaft 66 causes a two fold rotation of shaft 50. It will then be understood then that rotation of handle 12 to an orientation parallel to the surface 15 of the material to be tested will cause a 180° rotation of shaft 50. In turn, source wheel 30 is rotated to cause the radioactive material 33 to be directed toward bottom 21 of housing 11.

Because the only desired positions of source wheel 30 are up or down during use and storage of instrument 10, additional means are provided to insure that handle remains in one of these positions. Two flat surfaces 68 are provided on shaft 50 at the area thereof adjacent the internal support 51. The flats are arranged at 180° intervals around the shaft 50. Cooperating with the flat surfaces are a pair of flat leaf springs 70 surrounding shaft 50. Spring means (not shown) are provided for urging the flat members 70 toward one another. This arrangement provides a locking pressure around shaft 50 when the handle 12 is either perpendicular or parallel to the surface 15 of the material to be tested and pressure must be exerted on the handle 12 to move it from one desired operating position to another.

Returning to the description of arm 60, an extension 74 of the lower portion of plate member 62 is provided which is planer with plate member 62. In the illustrated embodiment protrusion 74 is triangular with its apex generally aligned at the level of shaft 66. A second stub shaft 75 is perpendicular secured to the apex area of plate 74 and is directed away from housing 11. A roller 76 is secured to the end of shaft 75 on bearings (not shown) so that its axis of rotation coincides with the axis of shaft 75. From the foregoing, it can be seen that rotation of arm 60 about the axis of shaft 66 will cause shaft 75 and its roller 76 to rotate in a circular arc having the axis of shaft 66 as its center and a diameter defined by the distance between the axis of shaft 66 and the axis of shaft 75. A similar protrusion 74, shaft and roller arrangement is provided on arm 61, and shaft 66 of arm 61 is rotably received in socket 72 of end wall 23.

Figure 6:
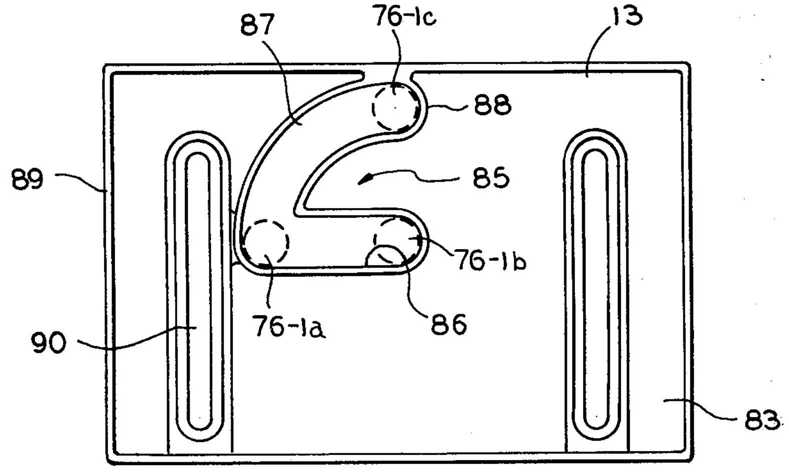
FIG. 6 is a side view of one of the end plates of the instrument shown in FIGS. 1 and 2 taken along the line 6—6 of FIG. 2.
Figure 7A:
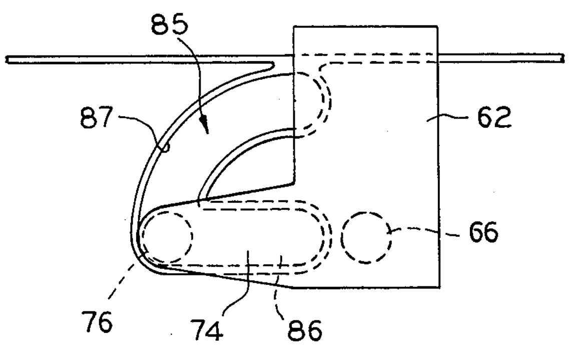
FIGS. 7(*a*), 7(*b*) and 7(*c*) are fragmentary views showing the mounting arm in its various operative positions.
Figure 7B:
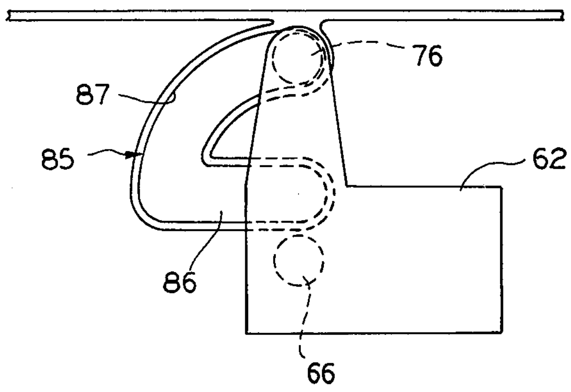
Figure 7C:
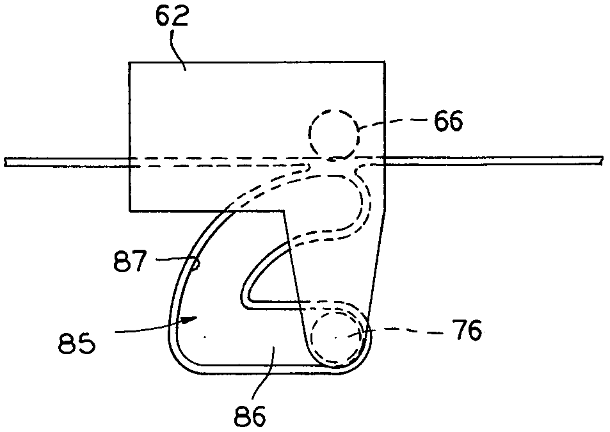

FIG. 6 shows a side view of one of the end plates 13 taken along the line 6—6 of FIG. 2. End plate 13 may be constructed from plastics, metal or other suitable materials and is shaped to conform to the end wall 22 of housing 11. In the illustrated embodiment, end plate 13 is generally rectangular and includes an enlarged lower end 63 as seen in FIG. 2. Because end plates 13 serve to support testing instrument 10 in one of its operating positions, the enlargement 83 provides support for instrument stability.

End plate 13 includes a track 85 located at approximately the upper middle portion thereof on the side disposed toward housing 11. Track 85 consists of two major portions, a straight portion 86 parallel to the base of end plate 13 and a curved portion 87. The entire track 85 has a width which is equal to or just slightly larger than the diameter of roller 76 of arm 60. The track 85 is defined by a raised edge 88.

Track 85 begins at a location which, when end plate 13 is in the position of FIG. 2, represents a point which is coaxial with shafts 66. The straight portion 86 of track 85 then travels toward side 89 of end plate 13 by a distance equal to the distance between the axis of shaft 66 and the axis of shaft 75 of arm 60. Track 85 then continues as curved portion 87 toward the top of end plate 13 in an arc having a radius equal to the distance between the axis of shaft 66 and the axis of shaft 75.

End plate 13 also includes a pair of parallel slots 90 disposed perpendicularly between the top and bottom of end plate 13 and respectively between the sides of end plate 13 and track 85. The slots are open through end plate 13 and begin near the bottom of end plate 13 and extend upwardly to a point above the straight portion 86 of track 85.

Slots 90 are provided for coupling the end plates 13 to housing 11. In the illustrated embodiment four pairs of pins 92 are secured to each of end walls 22 and 23. Pins 92 pass through slots 90 and have an enlarged head spaced from the end walls by a distance which approximates the thickness of enlarged portion 83 of end plates 13. Pins 92 are located at a height so that the pins reside at the lower portion of slots 90 when the housing 11 and end plates 13 are disposed on a common surface.

Now that the major components of testing instrument 10 have been described, the method of operation of the device can be more fully understood. Again referring to FIGS. 1(*a*) and 7(*a*), instrument 10 is shown in its storage or carrying position with handle 12 in a vertical postion. When handle 12 is in this position, plates 62 of arms 60 and 61 are also vertical and source wheel 30 is disposed with its radioactive material 33 directed toward top 20 of housing 11 and within barrier 40 to protect the operator from exposure to potentially harmful radiation. Rollers 76 of arms 60 and 61 are located within the tracks 85 of the respective end plates 13 at the junction of the straight portions 86 and the curved portions 87. The bottoms of end plates 13 are level with the bottom 21 of housing 11 and pins 92 protrude through the bottom portion of slots 90. The shaft 50 is "locked" in this first position by the spring held plates 70 cooperating with the flats 68 on stub shaft 50.

In FIGS. 1(*c*) and 7(*b*) the first operating position, the handle 12 has been moved rearwardly to a horizontal orientation. The handle rotation of 90° causes a 180° rotation of source wheel 30 so that the radioactive material 33 is now directed downwardly toward bottom 21. The end plates 13 have not moved with respect to housing 11 because roller 76 have traveled through a 90° arc along the curve portion 87 of tracks 85 in the end plates 13. Again the spring held plate members 70 lock handle 12 in this position by the compressive force against the flats 68 on shaft 50. A backscatter radiation measurement is taken by the radiation detection components 26 of the instrument 10.

Finally, rotation of handle 12 180° back through its original vertical position to a forward horizontal position places instrument 10 in the operating position shown in FIGS. 1(*b*) and 7(*c*). The handle movement causes a 360° rotation of source wheels 30 so that radiation material 33 is again directed toward bottom 21 of housing 11 and housing 11 is raised with respect to end plates 13 so that bottom 21 is elevated from the surface 15 of the material to be tested. As handle 12 is moved to the vertical position, the rollers 76 travel back along the curved portions 87 of track 85 to the junction of straight portions 86 and curved portions 87. Further rearward movement of handle 12 then causes the rollers 76 to travel along the straight portion 86 of tracks 85 creating a downward pressure on track 85 which raises the housing 11 as handle 12 is moved to the position shown in FIGS. 1(*b*) and 7(*c*). Pins 92 ride upwardly in the slots 90 as the housing 11 is elevated. The flats 68 on shaft 50 cooperate also in this position with the spring plates 70 to lock the handle in the final operating position. A radiation backscatter measurement is again taken while the instrument 10 is in the position shown in FIG. 1(*b*).

While the invention has been described in connection with a single preferred embodiment, the invention may be variously embodied. For example, the radioactive material need not be in the form of a source wheel 30. A rod, perpendicularly attached to shaft 50 within barrier 40 and having a cylindrical cavity at its free end will accomplish the same results as previously described. So while the invention has been described in detail in connection with this one preferred embodiment, it is not to be limited thereby, but is to be limited solely by the claims which follow.

We claim:

1. A backscatter radiation meter instrument comprising:
   a housing;
   a radioactive source within said housing, said radioactive source being adapted for controllably emitting photons through said housing;
   radiation detector means within said housing;
   shield means within said housing for shielding said detector means from direct radiation emitted from said source;
   instrument support means at opposed end walls of said housing, said housing being slidably mounted between said support means for vertical movement; and
   handle for said instrument, said handle being rotatable and being operatively coupled to said housing, to said source and to said support means whereby selected rotation of said handle causes vertical movement of said housing with respect to said support means and movement of said source within said housing.

2. A backscatter radiation meter instrument comprising:
   a housing;
   a radioactive source within said housing, said radioactive source being adapted for controllably emitting photons through said housing and said source being rotably mounted within said housing on a shaft means;
   radiation detector means within said housing;
   shield means within said housing for shielding said detector means from direct radiation emitted from said source;
   instrument support means at opposed end walls of said housing, said housing being slidably mounted between said support means for vertical movement; and
   a handle for said instrument, said handle being rotatable and being operatively coupled to said housing, said shaft means and support means whereby selected rotation of said handle causes vertical movement of said housing with respect to said support means and rotation of said source about said shaft means.

3. The invention set forth in claim 2 wherein said source comprises a circular wheel having a quantity of radioactive material at a discrete area at its circumference.

4. The invention set forth in claim 3 wherein said wheel is disposed within said housing between and generally parallel to said support means.

5. The invention of claim 4 wherein said shield means comprises an enclosure surrounding said source but for the area between said source and the bottom of said housing.

6. The invention set forth in claim 3 wherein gear means are provided coupling said handle means and said shaft means.

7. The invention set forth in claim 2 wherein rotation of said handle causes a two fold rotation of said source about said shaft means.

8. The invention of claim 7 wherein said handle has two ends one of which is coupled to a second shaft means intermediate said first end wall and its adjoining support means, and the other end of said handle being rotatably mounted to said housing intermediate said other end wall and the other support means, said second shaft including means mounted thereon and coupled to said source shaft.

9. The invention set forth in claim 8 wherein said handle is rotatable into three positions, a first position wherein said handle is perpendicular with respect to the bottom of said housing and second and third positions each being approximately 90° from said first position, said handle being generally parallel to the bottom of said housing in said second and third positions.

10. The invention set forth in claim 9 wherein said radioactive area of said source wheel is directed toward the top of said housing when said handle is in its first position and wherein said radioactive area of said source wheel is directed toward the bottom of said housing when said handle is in either its second or in its third position.

11. The invention set forth in claim 10 wherein said one end of said handle is operatively coupled to said source shaft means by a connecting means including a first portion for being coupled to said handle and a shaft perpendicular thereto, said shaft being generally parallel with said source shaft means.

12. The invention of claim 11 further including gear means on adjacent portions of said second shaft and said source shaft means, said gear means being selected whereby rotation of said connecting means shaft causes a two-fold rotation of said source of said source shaft means.

13. The invention set forth in claim 11 wherein said connecting means additionally includes means for engaging the adjoining support means to raise said housing with respect to said support means when said handle is moved from its first to its second position.

14. The invention set forth in claim 13 wherein said additional means comprise another shaft radially displaced from said second shaft; the axis of said another shaft being generally parallel to the axis of said second shaft and a roller rotatably mounted on the free end of said another shaft for rotation about the axis of said another shaft and wherein said adjoining support means includes a cam surface arranged to be engaged by said roller means as said handle is moved from its first to its second position, said roller engagement against said cam surface causing vertical elevation of said housing with respect to said support means as said handle is moved from its first to its second position.

15. The invention set forth in claim 14 where said support means includes a track for engaging said roller, said roller being movable in said track as said handle is moved to or between any of its three positions, said track including a curved portion and a straight portion, said straight portion having a length equal to the distance between the axis of said second shaft and said another shaft said curved portion defining an arc of approximately 90° commencing at one end of said straight portion and having a radius of curvature equal to the length of said straight portion, whereby said roller moves in said curved portion when said handle is moved from its first to its third position and moves in said straight portion when said handle is moved between its first and second positions.

16. The invention set forth in claim 13 wherein said support means comprise plate means, said plate means including a pair of parallel, vertical slots therethrough and wherein said housing is slidably mounted between said support means by projecting means secured to said housing and passing through said slots of said support means.

17. The invention set forth in claim 15 wherein said other end of said handle includes said connecting means and said another support means includes said track means, said second shaft thereof being rotatably mounted to said other end wall.

18. The invention set forth in claim 11 wherein said instrument further includes means for preferentially urging said handle to one of its three positions.

19. The invention set forth in claim 18 wherein said urging means includes at least two flat surfaces on said source shaft and means mounted to said housing for engaging said flat surfaces when said handle is in one of its three positions.

20. The invention set forth in claim 19 wherein said flat surface engaging means include springs for imposing resistance to handle rotation as said handle is moved to another of its positions.

21. The invention set forth in claim 17 wherein means are provided for preferentially urging said handle to any of its three positions and said means including flat surfaces on at least one of said shafts and means mounted to said housing for engaging said flat surfaces when said handle is in any of its three positions.

22. An instrument for taking backscatter radiation measurements comprising:

a housing including a top, bottom, front, back and generally parallel end walls;

support plates for said housing disposed parallel to said end walls, said housing being slidably mounted between said support plates for vertical movement therebetween;

a shaft within said housing and a radioactive source secured to said shaft;

a radiation detector, counter and display means in said housing and shield means in said housing for preventing radiation emitted from said source from impinging directly on said detector;

gear means on said shaft;

handle means for carrying said instrument and providing a visual indication of source position within said housing, said handle means being rotatably coupled to said shaft and including further gear means coupled to said shaft gear means whereby rotation of said handle causes a two-fold rotation of said shaft, said handle being rotatable between three positions, a first position in which said handle is vertical and said source is directed toward the top of said housing and second and third horizontal positions in which said source is directed toward the bottom of said housing, said handle being directed toward the front and toward the back of said housing respectively, and means coupled to said handle means for engaging at least one of said support plates when said handle is moved from its first position to either its second or its third position to cause vertical elevation of said housing with respect to said support plates, movement of said handle to the other of said second or third positions causing rotation of said source but no vertical movement of said housing with respect to said support plates.

* * * * *